United States Patent
Cheong et al.

(10) Patent No.: US 10,885,236 B2
(45) Date of Patent: Jan. 5, 2021

(54) CONSTRAINT-ORIENTED PROGRAMMING APPROACH TO MECHANICAL ASSEMBLY DESIGN

(71) Applicant: AUTODESK, INC., San Rafael, CA (US)

(72) Inventors: Hyunmin Cheong, Toronto (CA); Mehran Ebrahimi, Toronto (CA); Francesco Iorio, Toronto (CA); Adrian Butscher, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 360 days.

(21) Appl. No.: 15/866,398

(22) Filed: Jan. 9, 2018

(65) Prior Publication Data

US 2019/0213300 A1   Jul. 11, 2019

(51) Int. Cl.
    *G06F 30/17*     (2020.01)
    *G06F 30/15*     (2020.01)
    *G06F 111/04*    (2020.01)

(52) U.S. Cl.
    CPC .............. *G06F 30/17* (2020.01); *G06F 30/15* (2020.01); *G06F 2111/04* (2020.01)

(58) Field of Classification Search
    CPC ...................................................... G06F 30/17
    USPC ............................................................. 703/7
    See application file for complete search history.

(56) References Cited

U.S. PATENT DOCUMENTS

| | | | | |
|---|---|---|---|---|
| 4,345,486 A * | 8/1982 | Olesen | ................ | F16H 15/503 475/189 |
| 5,251,290 A * | 10/1993 | Pabon | ................ | G06Q 10/06 345/420 |
| 5,297,054 A * | 3/1994 | Kienzle | ................ | G06F 30/00 700/182 |
| 5,297,057 A * | 3/1994 | Kramer | ................ | G06F 30/17 703/7 |
| 6,102,958 A * | 8/2000 | Meystel | ................ | G06F 17/10 700/286 |
| 6,360,191 B1 * | 3/2002 | Koza | ................ | G06N 3/126 703/6 |

(Continued)

OTHER PUBLICATIONS

Brown et al. ("Exploring the use of constraint programming for enforcing connectivity during graph generation" the 5th workshop on modeling and solving problems with constraints (held at IJCAI05), 2005, pp. 1-6) (Year: 2005).*

(Continued)

*Primary Examiner* — Iftekhar A Khan
(74) *Attorney, Agent, or Firm* — Artegis Law Group, LLP

(57) ABSTRACT

A design engine systematically explores a design space associated with a design problem related to mechanical assemblies. The design engine implements a constraint programming approach to produce mechanical assembly configurations that adhere to a set of design constraints. For each feasible configuration, the design engine then optimizes various parameters to generate design options that meet a set of design objectives. With these techniques, the design space can be explored very quickly to generate significantly more feasible design options for the mechanical assembly than possible with conventional manual approaches. Accordingly, numerous design options can be generated that may otherwise never be produced using those conventional approaches.

20 Claims, 8 Drawing Sheets

(56) References Cited

U.S. PATENT DOCUMENTS

| | | | | |
|---|---|---|---|---|
| 6,629,065 B1* | 9/2003 | Gadh | G06F 30/17 | 703/1 |
| 6,963,824 B1* | 11/2005 | Davidson | G06F 30/00 | 703/2 |
| 7,062,341 B1* | 6/2006 | Karaikurichi | G06T 17/00 | 700/103 |
| 7,519,518 B2* | 4/2009 | Langemyr | G06F 17/12 | 703/2 |
| 7,610,182 B2* | 10/2009 | Smith | G06F 30/20 | 703/2 |
| 7,840,443 B2* | 11/2010 | Lukis | G06Q 30/0611 | 705/26.4 |
| 7,991,598 B1* | 8/2011 | Wood | F16H 57/00 | 703/7 |
| 8,463,581 B2* | 6/2013 | Corcoran | G06F 30/17 | 703/1 |
| 8,566,375 B1* | 10/2013 | Kerr-Delworth | G06F 16/21 | 708/200 |
| 8,868,380 B2* | 10/2014 | Chauvin | G06F 30/00 | 703/1 |
| 2004/0044504 A1* | 3/2004 | Shimizu | G06F 30/23 | 703/2 |
| 2005/0066301 A1* | 3/2005 | Lorenz | G06F 30/23 | 716/102 |
| 2005/0080502 A1* | 4/2005 | Chernyak | G06F 30/00 | 700/97 |
| 2005/0159936 A1* | 7/2005 | Rees | G06F 30/17 | 703/6 |
| 2009/0287336 A1* | 11/2009 | Rutka | G06F 30/00 | 700/103 |
| 2011/0189440 A1* | 8/2011 | Appleby | B29C 33/301 | 428/156 |
| 2013/0013993 A1* | 1/2013 | Oh | G06F 30/20 | 715/212 |
| 2016/0147911 A1* | 5/2016 | Bergin | G06F 30/20 | 703/1 |
| 2016/0171144 A1* | 6/2016 | Suiter | G06F 30/392 | 716/112 |
| 2017/0024511 A1* | 1/2017 | Cheong | G06F 30/00 | |
| 2018/0060469 A1* | 3/2018 | Morgan | G06F 30/20 | |
| 2018/0341604 A1* | 11/2018 | Gachon | B64G 1/66 | |

OTHER PUBLICATIONS

Lin et al. (A Method and Software Tool for Automated Gearbox Synthesis, 2009, ASME) (Year: 2009).*

LauB et al. ("The discrete adjoint method for parameter identification in multibody system dynamics", Multibody Syst Dyn (2017) 42:397-410) (Year: 2017).*

Favi et al. ("A multi-objective design approach to include material, manufacturing and assembly costs in the early design phase", Elsevier B.V., 2016, pp. 251-256) (Year: 2016).*

Beck et al., "Enforcing Connectivity in a Fixed Degree Graph: A Constraint Programming Case Study", 15 pages.

* cited by examiner

CONSTRAINT 500

"ONLY ONE JOINT ALLOWED ON INTERFACE COMPONENTS 1 & 2"

|   | A | B | C | D | E |
|---|---|---|---|---|---|
| 1 | 1 | 0 | 0 | 1 | 0 |
| 2 | 0 | 1 | 1 | 1 | 0 |
| 3 | 0 | 0 | 1 | 1 | 0 |
| 4 | 1 | 0 | 1 | 0 | 0 |
| 5 | 0 | 1 | 0 | 1 | 0 |
| 6 | 1 | 0 | 0 | 0 | 1 |
| 7 | 0 | 1 | 0 | 0 | 1 |

FIG. 5A

CONSTRAINT 520

"EXACTLY TWO JOINTS ALLOWED ON ALL VARIABLE COMPONENTS"

|   | A | B | C | D | E |
|---|---|---|---|---|---|
| 1 | 1 | 0 | 0 | 0 | 0 |
| 2 | 0 | 1 | 0 | 0 | 0 |
| 3 | 0 | 0 | 1 | 1 | 0 |
| 4 | 1 | 0 | 1 | 1 | 0 |
| 5 | 0 | 1 | 0 | 1 | 0 |
| 6 | 1 | 0 | 0 | 0 | 1 |
| 7 | 0 | 1 | 0 | 0 | 0 |

FIG. 5B

CONSTRAINT 540

"ALL JOINTS MUST CONNECT TO AT LEAST TWO COMPONENTS""

$$550$$

|   | A | B | C | D | E |
|---|---|---|---|---|---|
| 1 | 1 | 0 | 0 | 0 | 0 |
| 2 | 0 | 1 | 0 | 0 | 0 |
| 3 | 0 | 0 | 1 | 1 | 0 |
| 4 | 1 | 0 | 1 | 0 | 0 |
| 5 | 0 | 1 | 0 | 1 | 0 |
| 6 | 1 | 0 | 0 | 0 | 0 |
| 7 | 0 | 1 | 0 | 0 | 1 |

CONSTRAINT 560

"VARIABLE COMPONENTS CANNOT CONNECT BOTH ENDS TO THE SAME INTERFACE COMPONENT"

$$570$$

|   | A | B | C | D | E |
|---|---|---|---|---|---|
| 1 | 1 | 0 | 0 | 0 | 0 |
| 2 | 0 | 1 | 0 | 0 | 0 |
| 3 | 0 | 0 | 1 | 1 | 0 |
| 4 | 1 | 0 | 1 | 1 | 0 |
| 5 | 0 | 1 | 0 | 1 | 0 |
| 6 | 0 | 0 | 1 | 1 | 0 |
| 7 | 0 | 1 | 0 | 0 | 0 |

CONSTRAINT-ORIENTED PROGRAMMING APPROACH TO MECHANICAL ASSEMBLY DESIGN

BACKGROUND OF THE INVENTION

Field of the Invention

Embodiments of the present invention relate generally to computer-aided design and, more specifically, to a constraint-oriented programming approach to mechanical assembly design.

Description of the Related Art

In the context of mechanical design and engineering, an "assembly" is a collection of mechanical parts that are coupled together in a manner that achieves a particular function to address a specific design problem. One example of an assembly is an automobile transmission that includes a collection of gears coupled together to provide torque conversions. The design problem addressed in this example is the need to transmit torque from the automobile crankshaft to the automobile wheels.

Designing a mechanical assembly is typically a manually-performed, multi-step process. Initially, a designer formulates the design problem to be addressed by the mechanical assembly by determining a set of design objectives the assembly should meet. For example, when formulating the above-mentioned automobile transmission design problem, the designer could determine that the transmission should implement a specific conversion ratio in order to convert an input torque received from the automobile crankshaft to an output torque that is applied to the wheels of the automobile. In conjunction with determining the set of design objectives, the designer may further define the design problem by determining a set of design constraints that the assembly should not violate. In the transmission design problem discussed above, for example, the designer could determine that the mass of the transmission should not exceed a particular value.

Once the designer determines the various objectives and constraints, the designer then selects mechanical parts to be included in the assembly. For example, the designer of the transmission could select a collection of gears for inclusion in the transmission. Finally, the designer determines specific physical couplings between the selected parts in an effort to achieve the different objectives without violating the various constraints. For example, the transmission designer could determine a specific arrangement of the selected gears to implement the desired conversion between input and output torques.

Through design processes similar to the above-described process, designers generate designs for various mechanical assemblies. Once a particular design is created using such a design process, a designer may test the design, typically via computer simulation, to determine whether the objectives are met without violating the constraints. This overarching process may be repeated indefinitely, in a trial-and-error fashion, to explore the design space associated with the design problem. By exploring the design space using this process of iteratively generating different designs, a designer may produce one or more successful designs.

One problem with conventional design processes, like the process described above, is that each step of the design process is typically performed manually by the designer. Consequently, each iteration of the overarching design process may consume an inordinate amount of time and effort. This particular issue is exacerbated when multiple iterations of the design process are required. Further, because each iteration of the design process can take quite a long time to complete, a designer may not be able to fully explore the design space associated with the design problem in any reasonable amount of time. Consequently, the designer may be able to generate only a small fraction of all possible successful designs, which ultimately limits the number of final design options.

As the foregoing illustrates, what is needed in the art are more effective techniques for designing mechanical assemblies.

SUMMARY OF THE INVENTION

Various embodiments of the present invention set forth a computer-implemented method for generating design options for mechanical assemblies, including generating a first data structure that indicates a first set of couplings between a first element type and a second element type included in a first assembly of elements, determining that the first assembly of elements does not violate the first constraint based on at least a portion of the first data structure, modifying one or more parameters associated with the first assembly of elements based on a first objective function, and determining that the one or more parameters maximize the first objective function to generate a first design option.

At least one advantage of the techniques described herein is that feasible designs of mechanical assemblies can be rapidly and automatically generated to address a given design problem. Accordingly, these techniques substantially increase the number of successful designs generated within a design space relative to what can be achieved via manually-driven prior art design processes. Further, the disclosed techniques can be applied to exhaustively identify all feasible designs, thereby avoiding situations where feasible designs are overlooked.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 5A-5D illustrate how local constraints can be applied to mechanical assembly configurations, according to various embodiments of the present invention;

DETAILED DESCRIPTION

In the following description, numerous specific details are set forth to provide a more thorough understanding of the present invention. However, it will be apparent to one of skill in the art that the present invention may be practiced without one or more of these specific details.

As noted above, with conventional approaches to designing mechanical assemblies, designers must perform a lengthy trial-and-error process to generate successful designs that address a design problem. This process is highly inefficient and therefore cannot be applied to fully explore a design space associated with the design problem. Consequently, only a limited number of successful designs can be generated in a reasonable amount of time.

To address these issues, embodiments of the invention include a design engine that systematically explores the design space associated with the design problem. The design engine implements a constraint programming approach to generate numerous configuration options that adhere to a set of design constraints. For each such configuration option, the design engine then optimizes various parameters to generate a set of design options that address the design problem.

An advantage of this approach is that the design space can be explored very quickly to generate significantly more feasible design options for the mechanical assembly than possible with conventional manual techniques. Accordingly, numerous design options can be generated that might otherwise go unnoticed using conventional manual techniques.

System Overview

Figure 1:
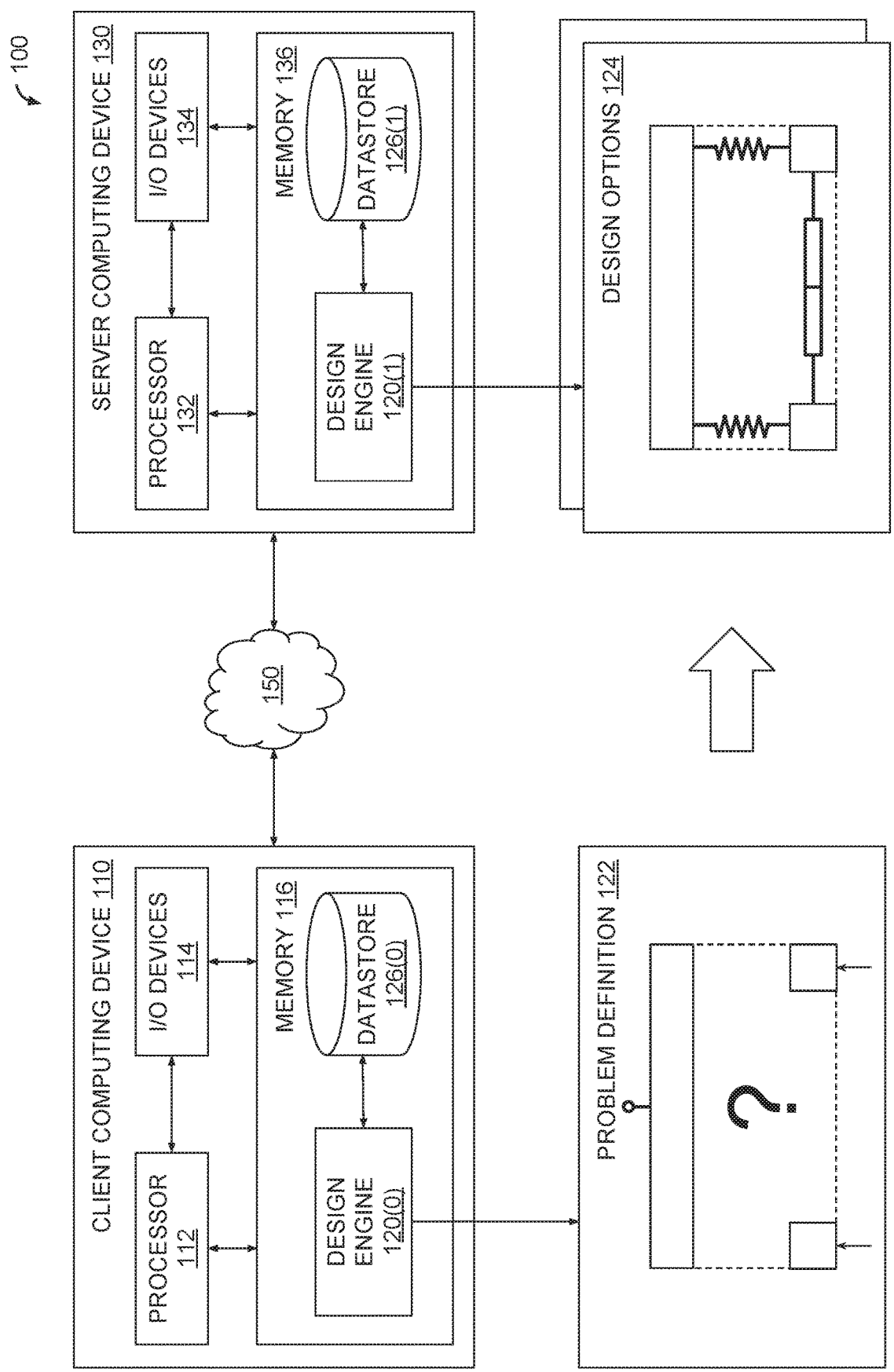
FIG. 1 illustrates a system configured to implement one or more aspects of the present invention.

FIG. 1 illustrates a system configured to implement one or more aspects of the present invention. As shown, a system 100 includes a client computing device 110 coupled to a server computing device 130 via a network 150.

Client computing device 110 includes a processor 112, input/output (I/O) devices 114, and a memory 116, coupled together. Processor 112 includes any technically feasible set of hardware units configured to process data and execute software applications. For example, processor 112 could include one or more of a central processing unit (CPU), a graphics processing unit (GPU), and an application specific integrated circuit (ASICs). I/O devices 114 include any technically feasible set of devices configured to perform input and/or output operations, including, for example, a display device, a keyboard, a mouse, and a touchscreen, among others. Memory 116 includes any technically feasible set of storage media configured to store data and software applications, such as a hard disk, a random-access memory (RAM) module, and a read-only memory (ROM), for example. Memory 116 includes a design engine 120(0) and a datastore 126(0).

Design engine 120(0) is a software application that, when executed by processor 112, generates problem definition 122. Problem definition 122 is a data structure that formally describes a design problem to be addressed via generation of a mechanical assembly. Problem definition 122 may indicate specific components that should be included in designs of the mechanical assembly, any physical relationships between those components, a set of objectives that should be met by mechanical assembly designs, and a set of constraints that should not be violated by those designs, among other things. Upon generating problem definition 122, design engine 120(0) transmits problem definition 122 to server computing device 130.

Server computing device 130 includes a processor 132, I/O devices 134, and memory 136, coupled together. Processor 132 includes any technically feasible set of hardware units configured to process data and execute software applications. I/O devices 134 include any technically feasible set of devices configured to perform input and/or output operations. Memory 136 includes any technically feasible set of storage media configured to store data and software applications. Memory 136 includes a design engine 120(1) and a datastore 126(1).

Design engine 120(1) is a software application that, when executed by processor 132, generates one or more design options 124 based on problem definition 122. Each design option 124 represents a design of a mechanical assembly that addresses the design problem associated with problem definition 122. In particular, a given design option 124 specifies a collection of components configured with particular placement and intercoupling and defined according to particular physical parameters.

In operation, design engine 120(0) and design engine 120(0) cooperate to implement any and all of the inventive functionality described herein, and therefore may be considered to represent different portions of single distributed software entity. Thus, for simplicity, design engines 120(0) and 120(1) are referred to hereinafter collectively as design engine 120. Similarly, datastores 126(0) and 126(1) represent different portions of a single distributed storage entity. Therefore, for simplicity, datastores 126(0) and 126(1) may be referred to collectively as datastore 126.

Design engine 120 implements a set of software modules configured to perform various operations associated with generating problem definition 122 and generating design options 124. Those software modules are discussed in greater detail below in conjunction with FIG. 2.

Figure 2:
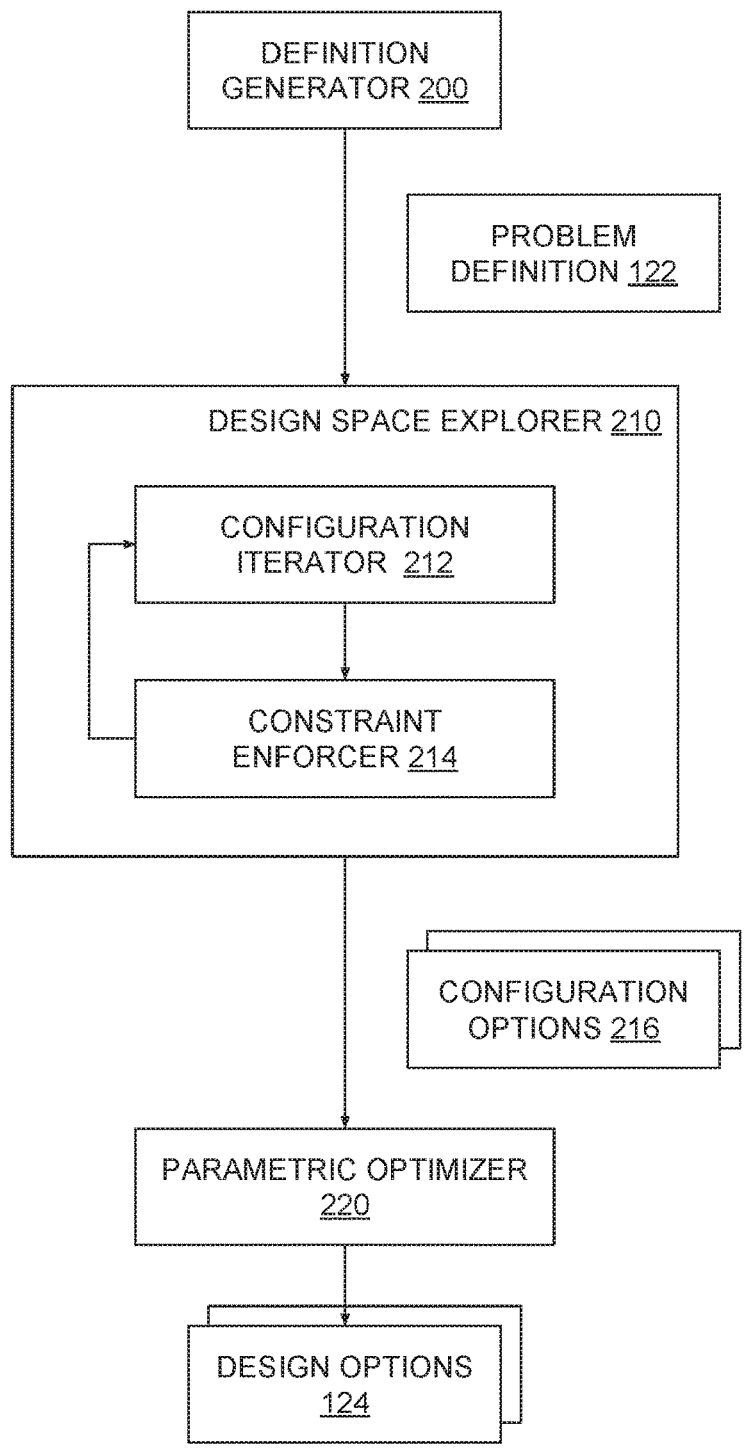
FIG. 2 is a more detailed illustration of the design engine of FIG. 1, according to various embodiments of the present invention.

FIG. 2 is a more detailed illustration of the design engine of FIG. 1, according to various embodiments of the present invention. As shown, design engine 120 includes a definition generator 200, a design space explorer 210, and a parametric optimizer 220.

Definition generator 200 is a software module configured to generate problem definition 122 based on data captured from the end-user. Problem definition 122 includes a set of design constraints that restrict how elements can be coupled together to form a configuration of a mechanical assembly. Problem definition 122 also includes a set of design objectives that define particular static and dynamic characteristics any mechanical assembly configuration should have in order to address the design problem. Definition generator 200 transmits problem definition 122 to design space explorer 200.

Design space explorer 210 is a software module configured to implement a constraint programming approach to generate configuration options for mechanical assemblies. In the context of this disclosure, a "configuration option" generally includes a discrete set of mechanical elements coupled together in a physically defined manner. A configuration option need not specify exact physical characteristics for each such element, though. For example, a given configuration option could describe a particular arrangement of springs, yet not specify the spring constant of each such spring.

As shown, design space explorer 210 includes a configuration iterator 212 and a constraint enforcer 214. These submodules interoperate to generate and test different configuration options iteratively using a constraint programming approach. According to this approach, configuration iterator 212 generates potential configurations, and constraint enforcer 214 then determines whether any of those configurations violate any design constraints set forth in problem definition 122. If a given configuration violates any design constraints, then configuration iterator 212 may perform a backtracking process and abandon that configuration, as is known to those familiar with constraint programming. In this manner, design space explorer 210 performs a process of configuration iteration to explore some or all of a design space associated with the design problem, thereby generating potentially numerous configuration options 216. Each such configuration option 216 may be considered "feasible" in the sense that a given configuration option 216 does not violate any design constraints.

Parametric optimizer 220 processes configuration options 216 generated via the above configuration iteration process and then performs an optimization process to refine those configuration options 216. In particular, parametric optimizer 220 assigns specific values to various parameters associated with each configuration option 216 to optimize those parameters relative to one or more design objectives. Returning to the spring example mentioned above, parametric optimizer 220 could determine specific values of spring constants that optimally meet an objective function set forth in problem definition 122. In this manner, parametric optimizer 220 generates design options 124. Each design option 124 includes not only a particular arrangement of elements, but also concrete parametric values associated with each element and/or with the assembly of elements as a whole.

In short, design engine 120 implements a two-step process for generating design options 124. In the first step, design space explorer 210 generates numerous feasible configuration options 216 that may or may not optimally address the design problem. Then, in the second step, parametric optimizer 220 optimizes each configuration option 216 according to design objectives to generate design options 124. These design options may, in fact, optimally address the design problem. The particular technique implemented by design space explorer 210 for iteratively generating configuration options 216 is described according to specific examples below in conjunction with FIGS. 3-6.

Example of Iteratively Generating Configuration Options

Figure 3:
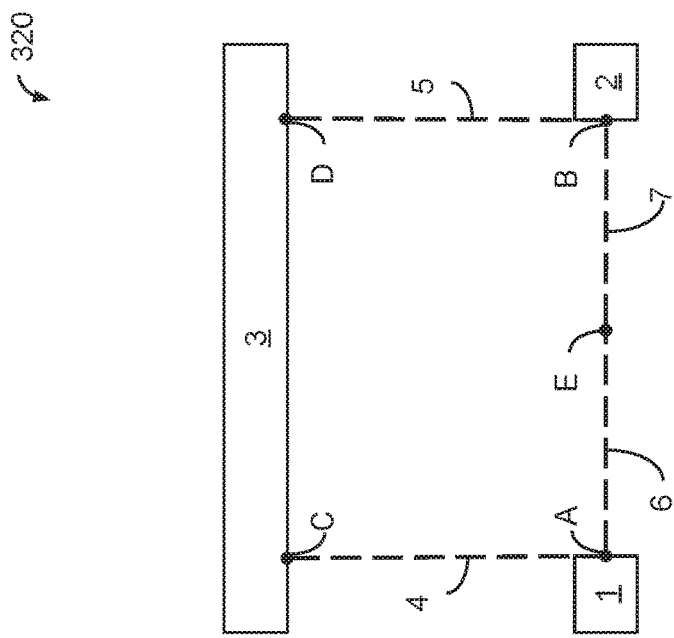
FIG. 3 conceptually illustrates how a graph of nodes defines a configuration of a mechanical assembly, according to various embodiments of the present invention.
Figure 3:
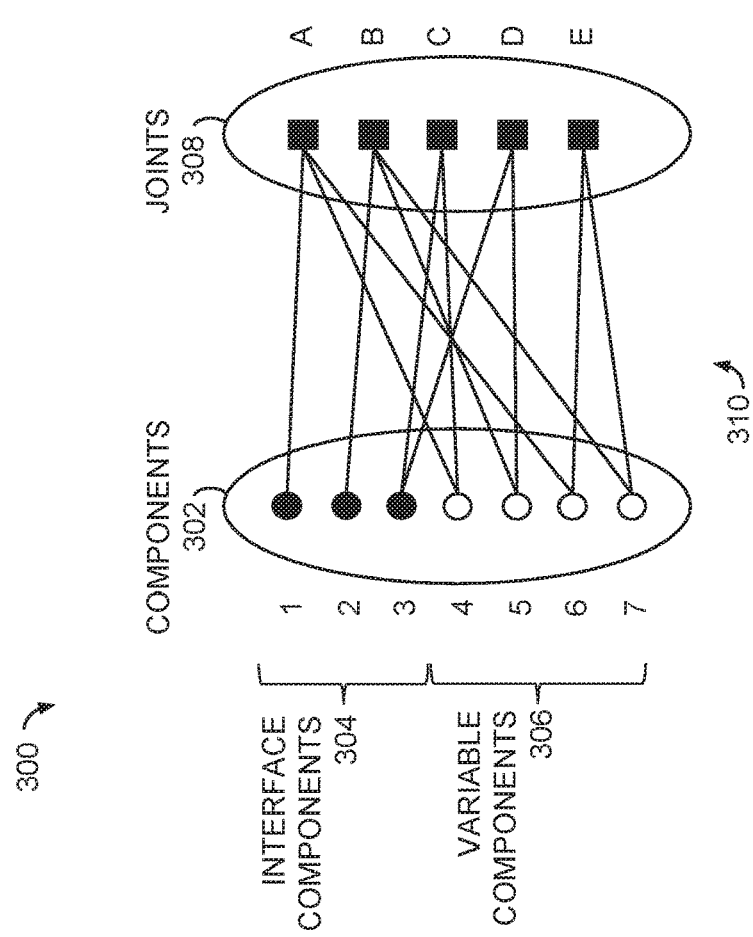

FIG. 3 conceptually illustrates how a graph of nodes defines a configuration of a mechanical assembly, according to various embodiments of the present invention. As shown, a bipartite graph 300 defines a configuration option 320. Bipartite graph 300 includes components 302 and joints 308, coupled together via edges 310.

Components 302 include various types of structural elements, including springs, solid bodies, dampers, and so forth. Components 302 fall into two categories: interface components 304 and variable components 306. Interface components 304 are defined by the end-user when providing inputs related to problem definition 122. For example, interface components 304 could include a solid body that the end-user defines with specific physical dimensions and residing in a particular location. Variable components, 306, on the other hand, include those components automatically generated by configuration iterator 212 during design space exploration. For example, configuration iterator 212 could iteratively place different components within a design space relative to the above-mentioned solid body in order to iteratively generate different design configurations. In doing so, configuration iterator 212 may operate with one or more data structures that represent configuration options. Configuration iterator 212 also generates edges 310 to represent physical coupling between components 302 and joints 308.

Joints 308 include various types of connective elements, including pin joints, ball joints, fixed joints, and so forth. Each joint 308 may be coupled to one or more components 302 via one or more edges 310, although typically a given joint 308 couples together two or more components 302. Although not shown in this example, joints 308 may include interface joints defined by the end-user as well as variable joints introduced via the iterative, generative design process performed by configuration iterator 212.

In the example shown, components 302 includes components 1, 2, and 3 included in interface components and components 4, 5, 6, and 7 included in variable components 306. Joints 308 include joints A, B, C, D, and E. Edges 310 couple together these various components and joints according to the arrangement shown. Configuration option 320 reflects this arrangement. For example, bipartite graph 300 indicates that component 3, shown as a wide rectangle within configuration option 320, is coupled to joints C and D. Bipartite graph 300 further indicates that joints C and D are coupled to components 4 and 5, respectively, as also shown in configuration option 320.

During the configuration iteration process described in conjunction with FIG. 2, design space explorer 210 may generate configuration option 320 (via configuration iterator 212) and then evaluate the feasibility of that configuration option against the set of design constraints included in problem definition 122 (via constraint enforcer 214). Again, the term "feasibility" here relates to a configuration option not violating any design constraints. The iteration and evaluation operations performed relative to configuration option 320 may occur in conjunction with the generation and evaluation of numerous other configuration options. For illustrative purposes, however, the iteration/evaluation operations performed by design space explorer 210 are discussed relative to the exemplary design option 320 shown and derivatives thereof.

To generate a configuration option for evaluation, design space explorer 210 implements a generative design process to select a set of variable components, a set of variable joints, and a set of interconnections between those elements (defined as edges 310 in bipartite graph 300). This selection process may be informed by previously generated configuration options by implementing techniques associate with constraint programming. Although not required to evaluate feasibility, design space explorer 210 may also assign specific default parametric values to the elements of design option 320.

To generate configuration option 320, design space explorer generates specifically structured data that represents bipartite graph 300, and then applies the design constraints by evaluating this structured data. The structured data generated to represent bipartite graph 300 is discussed in conjunction with FIG. 4, while the application of constraints relative to this data is discussed on conjunction with FIGS. 5A-6.

Figure 4:
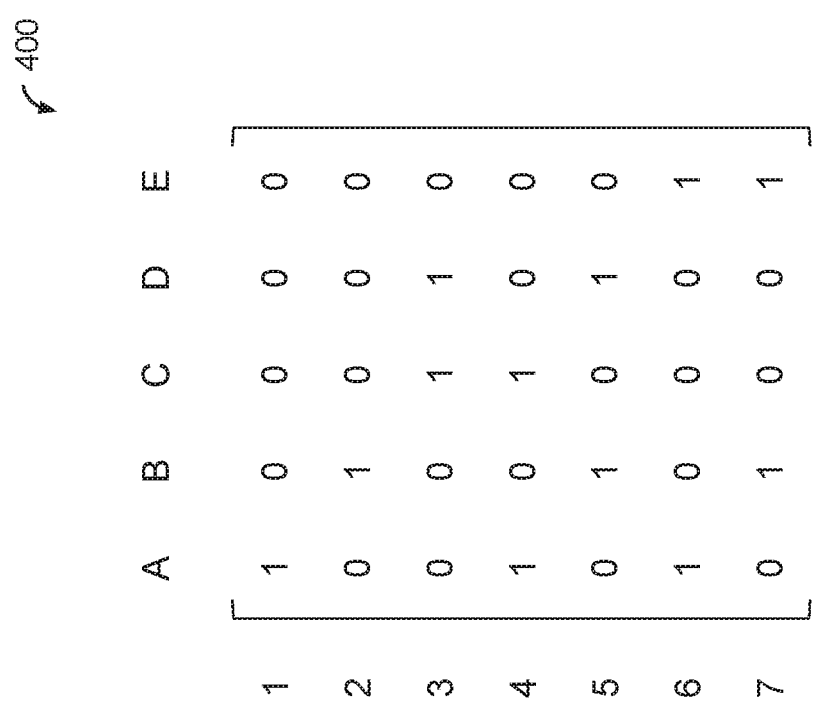
FIG. 4 conceptually illustrates how a matrix represents the mechanical assembly configuration of FIG. 3, according to various embodiments of the present invention.
Figure 4:
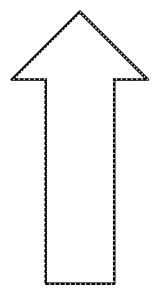
Figure 4:
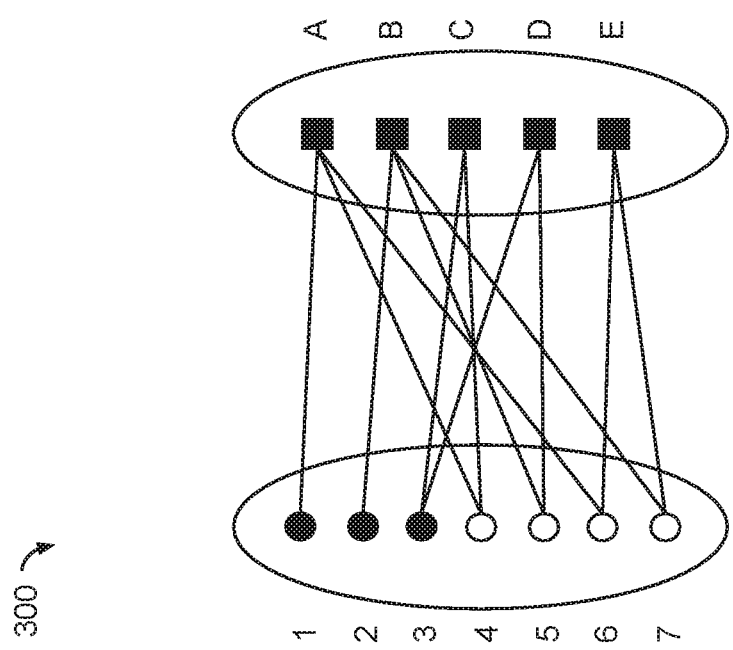

FIG. 4 conceptually illustrates how a matrix represents the mechanical assembly configuration of FIG. 3, according to various embodiments of the present invention. As shown, bipartite graph 300 is defined as a bi-adjacency matrix 400.

Bi-adjacency matrix 400 is a data structure that represents configuration option 320. The rows of matrix 400 correspond to components 1-7 and the columns of matrix 400 correspond to joints A-E. Each cell of matrix 400 is associated with a unique row/column pair, where the row included in the pair reflects a specific component type and the column included in the pair reflects a particular joint type. The value stored in a given cell of matrix 400 indicates whether or not the component and joint associated with the cell are coupled together in configuration option 320.

A "0" indicates that the associated component and joint are not connected to one another, while a "1" indicates that the associated component and joint are connected. For example, the third row of matrix 400, corresponding to component 3, includes a "1" at the third column, indicating that component 3 is coupled to joint C. Similarly, the third row of matrix 400 includes a "1" at the fourth column, indicating that component 3 is also coupled to joint D.

Via configuration iterator 212, design space explorer 210 generates matrices such as matrix 400 to represent a multitude of potential configurations. Some of these configurations may violate the design constraints, while others may not violate any constraints and thereby represent feasible configuration options. Via constraint enforcer 214, design space explorer 210 evaluates configuration feasibility using the techniques described in greater detail below in conjunction with FIGS. 5A-6.

FIGS. 5A-5D illustrate how local constraints can be applied to mechanical assembly configurations, according to various embodiments of the present invention. Each of FIGS. 5A-5D depicts an exemplary constraint and one or more operations performed by design space explorer 210 to identify that a given configuration option violates the exemplary constraint. The configuration options discussed in conjunction with these figures are derived from configuration option 320 and therefore include components 1-7 and joints A-E (represented here in matrix form). However, the connections between those components and joints may differ to illustrate how various constraints are violated.

Referring now to FIG. 5A, exemplary constraint 500 indicates that only one joint is allowed on interface components 1 and 2. This constraint, expressed for clarity here in natural language, can also be expressed as a mathematical inequality that is applied to a matrix 510 representing the associated configuration option. This inequality establishes a maximum number of binary "1" values that may be included in the rows associated with interface components 1 and 2. Specifically, because the maximum number of joints allowed on interface components 1 and 2 is one, the maximum number of binary "1s" permitted in rows 1 and 2 is also one. Design space explorer 210, via constraint enforcer 214, identifies constraint violations 512 and 514 within matrix 510, because these rows include greater than one binary "1s." When a constraint violation is detected in this fashion, design space explorer 210, via configuration iterator 212, may perform a backtracking operation to avoid further exploration of configurations derived from that associated with matrix 510.

Referring now to FIG. 5B, exemplary constraint 520 indicates that exactly two joints are allowed on all variable components. This constraint can be expressed as a mathematical equality requiring that the exact number of binary "1s" permitted in rows 4-7 is two. Design space explorer 210, via constraint enforcer 214, identifies constraint violations 532 and 534 within matrix 530, because these rows include three and one binary "1s," respectively. In response to the detection of this constraint violation, design space explorer 210 initiates corrective action to guide the exploration of the design space.

Referring now to FIG. 5C, exemplary constraint 540 indicates that all joints must connect to at least two components. This constraint can be expressed as a mathematical inequality requiring that the number of binary "1s" included in each column of matrix 550 be greater than or equal to two. Design space explorer 210, via constraint enforcer 214, identifies constraint violation 552 because the final column of matrix 550 only includes one binary "1." Design space explorer 210 may respond to this constraint violation by adjusting matrix 550, and then continuing the design exploration process, among other types of corrective action.

Referring now to FIG. 5D, exemplary constraint 560 indicates that variable components cannot connect both ends to the same interface component. This constraint can be expressed as the logical requirement a variable component and an interface component cannot share two connections to the same two joints. This constraint may help avoid situations where a variable component is affixed in a stationary manner to an interface component or placed inside of an interface component. To identify a constraint violation of this nature, design space explorer 210 may first collect the set of joint connections 572(A) and 572(B) from within matrix 570, and then identify constraint violation 574 based on the two sets of joint connections 572 including the same connections to joints C and D. In response to this violation, design space explorer 210 performs steps to guide design space exploration, as discussed above.

Referring generally to FIG. 5A-5D, the exemplary constraint violations discussed in conjunction with these figures generally fall into the overarching category of "local" constraints, because these constraints are identifiable on relatively small scale based on the analysis of a small number of connections between elements. In addition to local constraints, design space explorer 210 may also detect "global" constraints that are identifiable on a larger scale compared to local constraints, as discussed in greater detail below in conjunction with FIG. 6.

Figure 6:
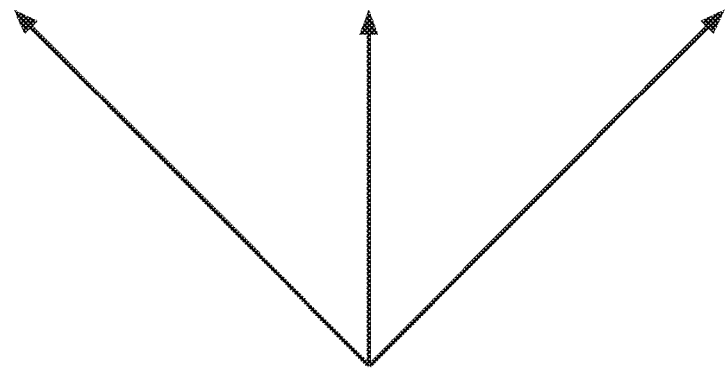
FIG. 6 illustrates how global constraints can be applied to mechanical assembly configurations, according to various embodiments of the present invention.

FIG. 6 illustrates how global constraints can be applied to mechanical assembly configurations, according to various embodiments of the present invention. As shown, a set of connectivity matrices 600 is derived from matrix 320. Each connectivity matrix 600 includes rows corresponding to variable components 4-7 and columns corresponding to variable components 4-7. Connectivity matrices 600 collectively indicate the number of intermediate elements between each variable component 308. More specifically, a particular connectivity matrix 600(K) indicates, for each pair of variable components 306, that a path of length K+1 exists between those two components. For example, connectivity matrix 600(0) includes a binary "1" in the first row, third column because variable components 4 and 6 are both coupled to joint A, representing a path length of one. The higher-order connectivity matrices 600(1) and 600(2) indicate path lengths of two and three, respectively, connecting different pairs of variable components 308.

Various global constraints can be enforced based on connectivity matrices 600. For example, a first global constraint may require that a path of some length must exist between every pair of components. This constraint can be enforced for a given configuration option by computing the associated connectivity matrices 600 for K=0 up to some maximum value, and then performing an OR operation between these matrices. If any binary zero values reside in any cells of the resultant matrix, then the two components associated with those cells are not connected by any path, and a global constraint violation is detected. In another example, a second global constraint may require that a path of length K exist between first and second components if a third component directly connected to the first component has a path of length K−1 to the second component. Violations of this exemplary constraint can be detected based on analysis of two consecutive connectivity matrices.

Persons skilled in the art will understand that connectivity matrices in general can be applied in the context of constraint enforcement to generate configuration options having specific kinematic properties. For example, the exemplary constraints discussed above can be applied to eliminate configuration options that lack graph connectivity and do not form a kinematic loop.

In addition to the kinematic constraints discussed above, design space explorer 210 may also enforce other types of global constraints, as well. In particular, when iteratively generating configurations, design space explorer 210 may compare those configurations to previously generated configurations and then apply certain rules to eliminate particular configurations. For example, design space explorer 210 could apply a global constraint indicating that mirror-image configuration options should not be permitted. When a configuration option is generated that is a mirror image of a previously generated configuration option, design space explorer 210 would determine that the newly-generated configuration option violates the mirror-image constraint and is therefore infeasible. Design space explorer 210 may implement other global constraints, as well. For example, design space explorer 210 could apply another global constraint indicating that only one configuration option consisting entirely of dampers should be generated. Then, if a second such configuration is generated, that second configuration would be eliminated.

Via the approaches discussed above in conjunction with FIGS. 3-6, design space explorer 210 explores a design space to generate configuration options 216 shown in FIG. 2. Each configuration option 216 describes an assembly of components that do not violate any design constraints. In various embodiments, design space explorer 210 may implement techniques to improve how quickly the design space can be explored and therefore increase the rate at which configuration options can be generated. For example, design space explorer 210 may implement genetic or evolutionary algorithms to guide the iterative generation of configuration options 216.

Upon generating configuration options 216, design engine 120 may then invoke parametric optimizer 220 to perform an optimization procedure. In so doing, parametric optimizer 220 processes each configuration option 216 to optimize various physical parameters. Those physical parameters could include, for example, physical dimensions of components, materials of composition, spring constants, damping values, resistance values, element cross-sections, and other parameters that may be associated with a configuration of elements. Parametric optimizer 220 generally implements a goal-driven optimization process that maximizes (or minimizes) one or more objective functions.

Persons skilled in the art will understand that parametric optimizer 220 may implement any technically feasible optimization algorithm, including a multi-objective solver, a generative design algorithm, a genetic or evolutionary algorithm, and so forth. The various operations performed by design engine 120 discussed thus far are also described in stepwise fashion below in conjunction with FIG. 7.

Figure 7:
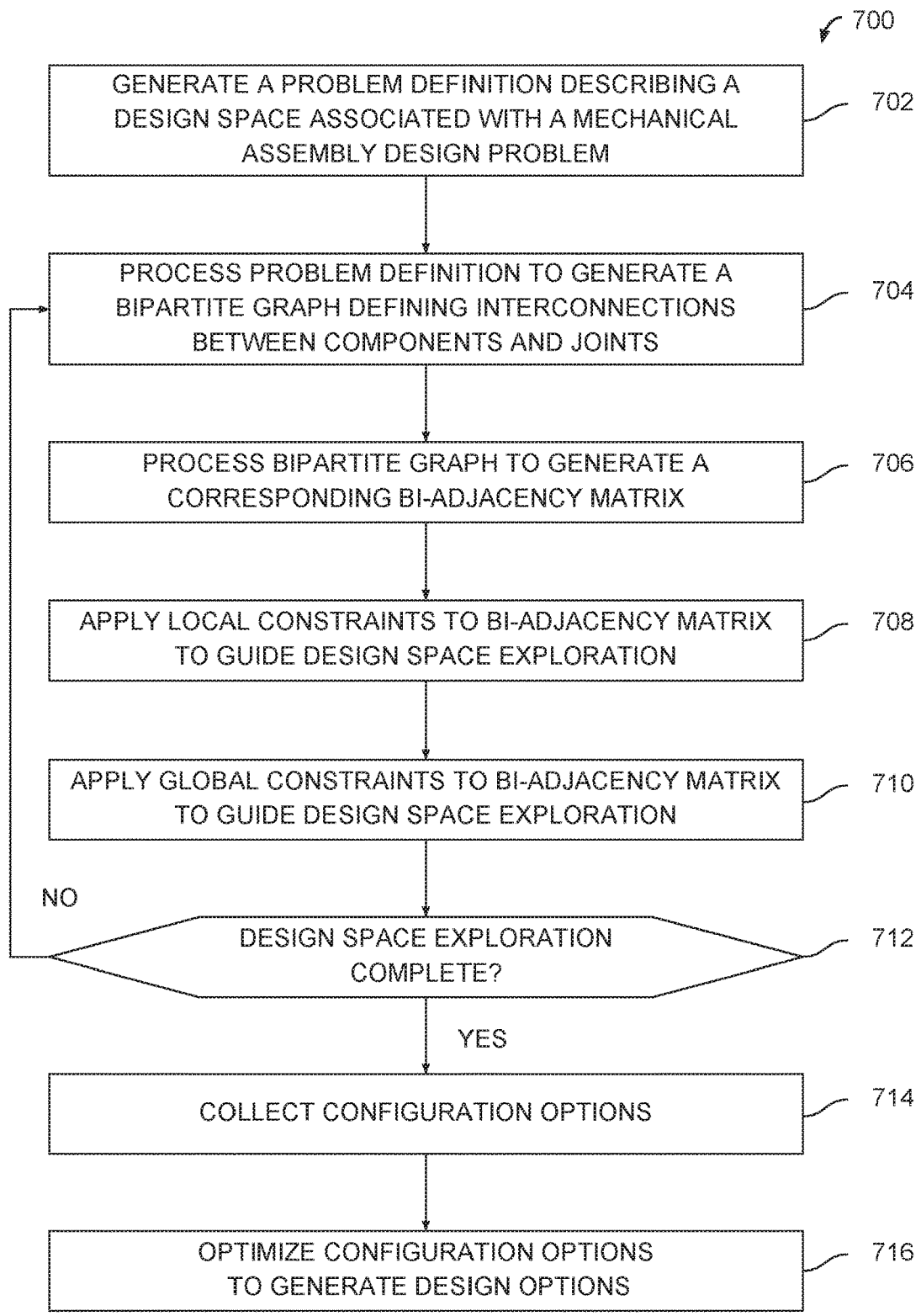
FIG. 7 is a flow diagram of method steps for generating a set of design options to address a mechanical assembly design problem, according to various embodiments of the present invention.

FIG. 7 is a flow diagram of method steps for generating a set of design options to address a mechanical assembly design problem, according to various embodiments of the present invention. Although the method steps are described in conjunction with the systems of FIGS. 1-6, persons skilled in the art will understand that any system configured to perform the method steps, in any order, is within the scope of the present invention.

As shown, a method 700 begins at step 702, where design engine 120 generates a problem definition describing a design space associated with a mechanical assembly design problem. Design engine 120 may capture and then process input data to structure data associated with the problem definition. At step 704, design engine 120 processes the problem definition to generate a bipartite graph defining interconnections between components and joints. In one embodiment, design engine 120 need not perform step 704 and may proceed directly to step 706, thereby skipping generation of the bipartite graph. At step 706, design engine 120 processes the bipartite graph generated at step 704 to generate a corresponding bi-adjacency matrix. In embodiments where design engine 120 does not generate the bipartite graph, design engine 120 may directly generate the bi-adjacency matrix in order to define a particular configuration option.

At step 708, design engine 120 applies local constraints to the bi-adjacency matrix to guide design space exploration. Design engine 120 may apply various constraints and then, upon detecting a constraint violation, eliminate the offending configuration option and perform a backtracking operation, as known to those familiar with constraint programming. In addition, design engine 120 may modify the bi-adjacency matrix associated with the offending configuration option to avoid the constraint violation. At step 710, design engine 120 applies global constraints to the bi-adjacency matrix to guide design space exploration. Design engine 120 may perform backtracking, configuration elimination, or configuration modification, among others, to resolve the constraint violation. In various embodiments, steps 708 and 710 may be performed in any order and potentially in parallel with one another.

At step 712, design engine 120 determines whether design space exploration is complete. In doing so, design engine 120 may evaluate criteria commonly associated with constraint programming, including indicators representing the fraction of total possible configurations considered. If design space exploration is incomplete, then the method 700 returns to step 704 and repeats steps 704, 706, 708, and 710 to evaluate additional configuration options. Otherwise, the method proceeds to step 714.

At step 714, design engine 120 collects all configuration options determined to be feasible via the iterative constraint programming approach discussed above. At step 716, design engine 120 optimizes parameters associated with each configuration option to generate a set of design options. In this manner, design engine 120 performs a sequence of interrelated operations to automatically generate mechanical assembly design options that address a specific design problem.

In sum, a design engine systematically explores a design space associated with a design problem related to mechanical assemblies. The design engine implements a constraint programming approach to produce mechanical assembly configurations that adhere to a set of design constraints. For each feasible configuration, the design engine then optimizes various parameters to generate design options that meet a set of design objectives. Accordingly, the design space can be fully or at least partially explored in an expeditious manner.

An advantage of this approach is that the design space can be explored very quickly to generate significantly more feasible design options for the mechanical assembly than possible with conventional manual techniques. Accordingly, numerous design options can be generated that may otherwise never be produced using conventional manual approaches. Thus, the disclosed techniques represent a specific technological advancement that directly addresses how conventional manual approaches problematically fail to fully explore a design space and only produce a limited number of design options.

1. Some embodiments of the invention include a computer-implemented method for generating design options for mechanical assemblies, the method comprising: generating a first data structure that indicates a first set of couplings between a first element type and a second element type included in a first assembly of elements, determining that the first assembly of elements does not violate the first constraint based on at least a portion of the first data structure, modifying one or more parameters associated with the first assembly of elements based on a first objective function, and determining that the one or more parameters maximize the first objective function to generate a first design option.

2. The computer-implemented method of clause 1, wherein the first data structure comprises a matrix of binary values that includes a set of rows corresponding to the first element type and a set of columns corresponding to the second element type.

3. The computer-implemented method of any of clauses 1 and 2, wherein a first row included in the set of rows corresponds to an instance of the first element type, a first column included in the set of columns corresponds to an instance of the second element type, and a first cell of the matrix of binary values includes a first value indicating that the instance of the first element type is coupled to the instance of the second element type.

4. The computer-implemented method of any of clauses 1, 2, and 3, wherein the first element type includes structural elements, and the second element type includes connective elements that couple the structural elements to one another.

5. The computer-implemented method of any of clauses 1, 2, 3, and 4, wherein the first element type comprises a first element subtype and a second element subtype, and wherein the first element subtype includes instances of the first element type that are specified by an end-user, and the second element subtype includes instances of the first element type generated via a generative design process.

6. The computer-implemented method of any of clauses 1, 2, 3, 4, and 5, wherein the at least a portion of the first data structure comprises either a row or a column of a matrix, and the first constraint comprises a mathematical expression, and wherein analyzing the at least a portion of the first data structure comprises evaluating the mathematical expression based on either the row or the column of the matrix.

7. The computer-implemented method of any of clauses 1, 2, 3, 4, 5, and 6, wherein the first constraint indicates a maximum number of couplings associated with instances of the first element type and instances of the second element type.

8. The computer-implemented method of any of clauses 1, 2, 3, 4, 5, 6, and 7, wherein the first constraint indicates a maximum number of couplings between a first instance of the first element type and a first instance of the second element type.

9. The computer-implemented method of any of clauses 1, 2, 3, 4, 5, 6, 7, and 8, wherein the first constraint indicates a minimum number of intermediate elements coupled between a first element included in the first assembly of elements and a second element included in the first assembly of elements.

10. The computer-implemented method of any of clauses 1, 2, 3, 4, 5, 6, 7, 8, and 9, wherein the first constraint indicates that the first assembly of elements cannot be a mirror image of a second assembly of elements associated with a second design option.

11. Some embodiments of the invention include a non-transitory computer-readable medium storing program instructions that, when executed by a processor, cause the processor to generate design options for mechanical assemblies by performing the steps of: generating a first data structure that indicates a first set of couplings between a first element type and a second element type included in a first assembly of elements, determining that the first assembly of elements does not violate the first constraint based on at least a portion of the first data structure, modifying one or more parameters associated with the first assembly of elements based on a first objective function, and determining that the one or more parameters maximize the first objective function to generate a first design option.

12. The non-transitory computer-readable medium of clause 11, wherein the first data structure comprises a matrix of binary values that includes a set of rows corresponding to the first element type and a set of columns corresponding to the second element type.

13. The non-transitory computer-readable medium of any of clauses 11 and 12, wherein a first row included in the set of rows corresponds to an instance of the first element type, a first column included in the set of columns corresponds to an instance of the second element type, and a first cell of the matrix of binary values includes a first value indicating that the instance of the first element type is coupled to the instance of the second element type.

14. The non-transitory computer-readable medium of any of clauses 11, 12, and 13, wherein the first element type includes structural elements, and the second element type includes connective elements that couple the structural elements to one another.

15. The non-transitory computer-readable medium of any of clauses 11, 12, 13, and 14, wherein the first element type comprises a first element subtype and a second element subtype, and wherein the first element subtype includes instances of the first element type that are specified by an end-user, and the second element subtype includes instances of the first element type generated via a generative design process.

16. The non-transitory computer-readable medium of any of clauses 11, 12, 13, 14, and 15, wherein the at least a portion of the first data structure comprises either a row or a column of a matrix, and the first constraint comprises a mathematical expression, and wherein analyzing the at least a portion of the first data structure comprises evaluating the mathematical expression based on either the row or the column of the matrix.

17. The non-transitory computer-readable medium of any of clauses 11, 12, 13, 14, 15, and 16, wherein the one or more parameters include a set of physical characteristics associated with instances of the first element type or instances of the second element type.

18. The non-transitory computer-readable medium of any of clauses 11, 12, 13, 14, 15, 16, and 17, further comprising, after determining that the first data structure does not violate the first constraint, generating one or more additional data structures derived from the first data structure.

19. The non-transitory computer-readable medium of any of clauses 11, 12, 13, 14, 15, 16, 17, and 18, further comprising the steps of: generating a second data structure that indicates a second set of couplings between the first element type and the second element type included in a second assembly of elements, analyzing at least a portion of the second data structure based on the first constraint and determining that the second assembly of elements violates the first constraint, and determining that the second assembly of elements violates the first constraint based on at least a portion of the second data structure, preventing any additional data structures derived from the second data structure from being generated.

20. Some embodiments of the invention include a system for generating design options for mechanical assemblies, comprising: a memory storing a design engine, and a processor that, when executing the design engine, is configured to perform the steps of: generating a first data structure that indicates a first set of couplings between a first element type and a second element type included in a first assembly of elements, determining that the first assembly of elements does not violate the first constraint based on at least a portion of the first data structure, modifying one or more parameters associated with the first assembly of elements based on a first objective function, and determining that the one or more parameters maximize the first objective function to generate a first design option.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for generating design options for mechanical assemblies, the method comprising:
generating a plurality of data structures, wherein each data structure included in the plurality of data structures indicates a different combination of elements and couplings between the elements included in a corresponding assembly of elements;
selecting at least a first assembly of elements based on the plurality of data structures, wherein the first assembly of elements is represented by a first data structure included in the plurality of data structures, and wherein selecting the first assembly of elements comprises determining that the first assembly of elements does not violate a first constraint based on at least a portion of the first data structure;

modifying one or more parameters associated with the first assembly of elements based on a first objective function; and determining that the one or more parameters maximize the first objective function to generate a first design option.

2. The computer-implemented method of claim 1, wherein the first data structure comprises a matrix of binary values that includes a set of rows corresponding to a first element type and a set of columns corresponding to a second element type.

3. The computer-implemented method of claim 2, wherein a first row included in the set of rows corresponds to an instance of the first element type, a first column included in the set of columns corresponds to an instance of the second element type, and a first cell of the matrix of binary values includes a first value indicating that the instance of the first element type is coupled to the instance of the second element type.

4. The computer-implemented method of claim 1, wherein each combination of elements includes structural elements and one or more connective elements that couple the structural elements to one another.

5. The computer-implemented method of claim 1, wherein the first assembly of elements comprises elements of a first element type, wherein the first element type comprises a first element subtype and a second element subtype, and wherein the first element subtype includes instances of the first element type that are specified by an end-user, and the second element subtype includes instances of the first element type generated via a generative design process.

6. The computer-implemented method of claim 1, wherein the at least a portion of the first data structure comprises either a row or a column of a matrix, and the first constraint comprises a mathematical expression, and wherein analyzing the at least a portion of the first data structure comprises evaluating the mathematical expression based on either the row or the column of the matrix.

7. The computer-implemented method of claim 1, wherein the first constraint indicates a maximum number of couplings associated with instances of a first element type and instances of a second element type.

8. The computer-implemented method of claim 1, wherein the first constraint indicates a maximum number of couplings between a first instance of a first element type and a first instance of a second element type.

9. The computer-implemented method of claim 1, wherein the first constraint indicates a minimum number of intermediate elements coupled between a first element included in the first assembly of elements and a second element included in the first assembly of elements.

10. The computer-implemented method of claim 1, wherein the first constraint indicates that the first assembly of elements cannot be a mirror image of a second assembly of elements associated with a second design option.

11. A non-transitory computer-readable medium storing program instructions that, when executed by a processor, cause the processor to generate design options for mechanical assemblies by performing the steps of:

generating a plurality of data structures, wherein each data structure included in the plurality of data structures indicates a different combination of elements and couplings between the elements included in a corresponding assembly of elements;

selecting at least a first assembly of elements based on the plurality of data structures, wherein the first assembly of elements is represented by a first data structure included in the plurality of data structures, and wherein selecting the first assembly of elements comprises determining that the first assembly of elements does not violate a first constraint based on at least a portion of the first data structure;

modifying one or more parameters associated with the first assembly of elements based on a first objective function; and determining that the one or more parameters maximize the first objective function to generate a first design option.

12. The non-transitory computer-readable medium of claim 11, wherein the first data structure comprises a matrix of binary values that includes a set of rows corresponding to a first element type and a set of columns corresponding to a second element type.

13. The non-transitory computer-readable medium of claim 12, wherein a first row included in the set of rows corresponds to an instance of the first element type, a first column included in the set of columns corresponds to an instance of the second element type, and a first cell of the matrix of binary values includes a first value indicating that the instance of the first element type is coupled to the instance of the second element type.

14. The non-transitory computer-readable medium of claim 11, wherein each combination of elements includes structural elements and one or more connective elements that couple the structural elements to one another.

15. The non-transitory computer-readable medium of claim 11, wherein the first assembly of elements comprises elements of a first element type, wherein the first element type comprises a first element subtype and a second element subtype, and wherein the first element subtype includes instances of the first element type that are specified by an end-user, and the second element subtype includes instances of the first element type generated via a generative design process.

16. The non-transitory computer-readable medium of claim 11, wherein the at least a portion of the first data structure comprises either a row or a column of a matrix, and the first constraint comprises a mathematical expression, and wherein analyzing the at least a portion of the first data structure comprises evaluating the mathematical expression based on either the row or the column of the matrix.

17. The non-transitory computer-readable medium of claim 11, wherein the one or more parameters include a set of physical characteristics associated with instances of a first element type or instances of a second element type.

18. The non-transitory computer-readable medium of claim 11, the steps further comprising, after determining that the first data structure does not violate the first constraint, generating one or more additional data structures derived from the first data structure.

19. The non-transitory computer-readable medium of claim 11, wherein the plurality of data structures further comprises a second data structure that indicates a second set of couplings between the first element type and the second element type included in a second assembly of elements, and the steps further comprise:

analyzing at least a portion of the second data structure based on the first constraint and determining that the second assembly of elements violates the first constraint; and determining that the second assembly of elements violates the first constraint based on at least a portion of the second data structure;

preventing any additional data structures derived from the second data structure from being generated.

20. A system for generating design options for mechanical assemblies, comprising:

a memory storing a design engine; and a processor that, when executing the design engine, is configured to perform the steps of:

generating a plurality of data structures, wherein each data structure included in the plurality of data structures indicates a different combination of elements and couplings between the elements included in a corresponding assembly of elements;

selecting at least a first assembly of elements based on the plurality of data structures, wherein the first assembly of elements is represented by a first data structure included in the plurality of data structures, and wherein selecting the first assembly of elements comprises determining that the first assembly of elements does not violate a first constraint based on at least a portion of the first data structure, modifying one or more parameters associated with the first assembly of elements based on a first objective function, and determining that the one or more parameters maximize the first objective function to generate a first design option.

* * * * *